(12) United States Patent
Tian et al.

(10) Patent No.: US 12,151,946 B2
(45) Date of Patent: Nov. 26, 2024

(54) POSITIVE ELECTRODE ACTIVE MATERIAL, SODIUM-ION SECONDARY BATTERY COMPRISING THE SAME AND ELECTRICAL APPARATUS

(71) Applicant: CONTEMPORARY AMPEREX TECHNOLOGY (HONG KONG) LIMITED, Hong Kong (CN)

(72) Inventors: Jiarui Tian, Fujian (CN); Xinxin Zhang, Fujian (CN); Chuying Ouyang, Fujian (CN); Yongsheng Guo, Fujian (CN); Jiadian Lan, Fujian (CN); Jixiang Wang, Fujian (CN); Wenguang Lin, Fujian (CN); Yuejuan Wan, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/388,884

(22) Filed: Nov. 13, 2023

(65) Prior Publication Data
US 2024/0083759 A1   Mar. 14, 2024

Related U.S. Application Data

(63) Continuation of application No. PCT/CN2021/143828, filed on Dec. 31, 2021.

(51) Int. Cl.
*C01C 3/11* (2006.01)
*H01M 10/054* (2010.01)

(52) U.S. Cl.
CPC ............. *C01C 3/11* (2013.01); *H01M 10/054* (2013.01); *C01P 2004/51* (2013.01);
(Continued)

(58) Field of Classification Search
CPC .......... C01C 3/11; C01C 3/12; H01M 10/054; H01M 2004/028; H01M 4/5825;
(Continued)

(56) References Cited

U.S. PATENT DOCUMENTS

| | | | |
|---|---|---|---|
| 2013/0260222 A1 | 10/2013 | Lu et al. | |
| 2014/0127560 A1* | 5/2014 | Wessells | H01M 10/36 429/188 |
| 2022/0399536 A1* | 12/2022 | Zhang | H01M 4/58 |

FOREIGN PATENT DOCUMENTS

| | | | | |
|---|---|---|---|---|
| CN | 106549155 A | | 3/2017 | |
| CN | 106920964 A | * | 7/2017 | .......... H01M 10/054 |

(Continued)

OTHER PUBLICATIONS

Wei et al., Structural regulated nickel hexacyanoferrate with superior sodium storage performance by K-doping, Nov. 2020, Chem. Eng. Journal, 421, 1-8 (Year: 2020).*

(Continued)

*Primary Examiner* — Daniel S Gatewood
(74) *Attorney, Agent, or Firm* — XSENSUS LLP

(57) ABSTRACT

The present application provides a positive electrode active material which may be in a particulate form and comprise a compound represented by Formula 1:

$$Na_xA_yM1[M2(CN)_6]_\delta \cdot zH_2O \quad \text{Formula 1}$$

wherein, A is selected from at least one of an alkali metal element and an alkaline earth metal element, and the ionic radius of A is greater than the ionic radius of sodium; M1 and M2 are each independently selected from at least one of a transition metal element, $0<y\le0.2$, $0<x+y\le2$, $0<\delta\le1$, and $0\le z\le10$; and the particles of the positive electrode active material may have a gradient layer in which the content of the A element decreases from the particle surface to the particle interior.

19 Claims, 2 Drawing Sheets

(52) U.S. Cl.
CPC ...... *C01P 2004/61* (2013.01); *C01P 2006/12* (2013.01); *C01P 2006/40* (2013.01); *C01P 2006/82* (2013.01)

(58) Field of Classification Search
CPC ...... H01M 10/052; H01M 4/58; H01M 4/362; H01M 4/366; C01P 2004/51; C01P 2004/61; C01P 2006/12; C01P 2006/40; C01P 2006/82; Y02E 60/10
See application file for complete search history.

(56) References Cited

FOREIGN PATENT DOCUMENTS

| CN | 108946765 | A | | 12/2018 | |
|---|---|---|---|---|---|
| CN | 112645354 | A | * | 4/2021 | ............ B82Y 30/00 |
| CN | 112723384 | A | | 4/2021 | |
| JP | 2015-079685 | A | | 4/2015 | |
| JP | 2020-092086 | A | | 6/2020 | |
| JP | 2021-104921 | A | | 7/2021 | |
| KR | 1020170104574 | A | | 9/2017 | |
| KR | 1020200034310 | A | | 3/2020 | |
| WO | 2020/059928 | A1 | | 3/2020 | |

OTHER PUBLICATIONS

Office Action issued Dec. 20, 2023 in Japanese Patent Application No. 2023-532821 with English translation thereof.
Office Action issued Jul. 26, 2023 in Korean Patent Application No. 10-2023-7018145 with English translation thereof.
Grant Notice issued on Oct. 4, 2023 in Korean Patent Application No. 10-2023-7018145 with English translation thereof.
International Search Report and Written Opinion mailed on Oct. 8, 2022, received for PCT Application PCT/CN2021/143828, filed on Dec. 31, 2021, 15 pages including English Translation.
Wei et al., "Structural regulated nickel hexacyanoferrate with superior sodium storage performance by K-doping", Chemical Engineering Journal, vol. 421, 2021, pp. 1-8.

* cited by examiner

POSITIVE ELECTRODE ACTIVE MATERIAL, SODIUM-ION SECONDARY BATTERY COMPRISING THE SAME AND ELECTRICAL APPARATUS

CROSS-REFERENCE TO RELATED APPLICATIONS

The present application is a continuation of international Application No. PCT/CN2021/143828, filed on Dec. 31, 2021, which is incorporated herein by reference in its entirety.

TECHNICAL FIELD

The present application relates to the technical field of secondary batteries, and in particular to a positive electrode active material, a sodium-ion secondary battery comprising the same and an electrical apparatus.

BACKGROUND ART

In recent years, there has been an increasing demand for lithium-ion batteries, however, the limited lithium resources have limited the sustainable development of lithium-ion batteries. As an important supplement to lithium-ion batteries, sodium-ion secondary batteries have attracted more and more attention.

Prussian blue materials have attracted wide attention due to a series of commercializable advantages such as high capacity, high-voltage platform, fast sodium ion transport channel, low cost and simple preparation. However, the existing prussian blue materials are prone to deterioration of electrochemical performance upon long-term storage. Therefore, there is still a need for an improved prussian blue material to further improve its storage performance, cycle performance, and the like.

SUMMARY OF THE DISCLOSURE

The present application has been made in view of the above-mentioned topics, and an object thereof is to provide a prussian blue material as a positive electrode active material having improved storage performance and cycle performance.

In order to achieve the above object, a first aspect of the present application provides a positive electrode active material which is in a particulate form and comprises a compound represented by Formula 1:

Formula 1 wherein, A is selected from at least one of an alkali metal element and an alkaline earth metal element, and the ionic radius of A is greater than the ionic radius of sodium; M1 and M2 are each independently selected from at least one of a transition metal element, $0<y\leq0.2$, $0<x+y\leq2$, $0<\delta\leq1$, and $0\leq z\leq10$; and the particles of the positive electrode active material have a gradient layer in which the content of the A element decreases from the particle surface to the particle interior.

Thus, both the storage performance and the cycle performance of the positive electrode active material are improved by the specific composition and the specific distribution of the A element, and the specific capacity of the material is not significantly decreased as compared with the prussian blue material undoped with the A element.

In any of embodiments, $0.04\leq y\leq0.2$. By controlling the content of the A element, it is possible to further make it difficult for the positive electrode active material to absorb water.

In any of embodiments, in the particles of the positive electrode active material, the thickness of the gradient layer with respect to the A element content is in a range of 10-100 nm, optionally in a range of 10-75 nm, wherein the thickness of the gradient layer with respect to the A element content refers to the distance from the layer with the content ratio of Na to A element reaching Na:A=50 At %:50 At % as measured when the element contents of the particles of the positive electrode active material is quantitatively measured by transmission electron microscopy-energy spectrum line scanning characterization method to the particle surface. By controlling the thickness of the gradient layer with respect to the A element content, it is possible to further improve the storage performance, cycle performance and specific capacity of the material.

In any of embodiments, the A is selected from at least one of Li, K, Rb, Cs, Be, Mg, Ca, Sr and Ba, optionally at least one of K, Rh, Cs, Mg and Ca, and further optionally at least one of K and Cs. By selecting the A element, it is possible to further improve the storage performance, cycle performance and specific capacity of the material.

In any of embodiments, the M1 and M2 are each independently selected from at least one of Fe, Mn, Ni, Co, Cu and Zn. By selecting the species of M1 and M2, it is possible for the material to have the desired electrochemical performance and electrochemical capacity while ensuring structural integrity.

In any of embodiments, the volume median particle diameter Dv50 of the positive electrode active material is in a range of 1-5 µm, and optionally in a range of 2-3.5 µm. By controlling the volume median particle diameter Dv50 of the material, it is possible to further improve the specific capacity of the material.

In any of embodiments, the specific surface area of the positive electrode active material is in a range of 1-10 m²/g, and optionally in a range of 2-6 m²/g. By controlling the specific surface area of the material, it is possible to achieve the desired doping effect with a smaller amount of element A, thus achieving a good balance between suppressing water absorption and avoiding decrease in the specific capacity of the material.

In any of embodiments, the water content of the positive electrode active material is ≤2 wt %, and optionally, the water content of the positive electrode active material is ≤0.5 wt %. The lower the water content, the better the cycle performance.

A second aspect of the present application further provide a method for preparing a positive electrode active material, the method comprising the steps of:

1) adding a positive electrode active material precursor into a solvent and dispersing to obtain a suspension, wherein the positive electrode active material precursor is a compound represented by Formula 2:

Formula 2 wherein the M1 and M2 are each independently selected from at least one of transition metal elements, $0<n\leq2$, and $0<\delta\leq1$;

2) cooling the suspension obtained in step 1), then adding a salt of A into the suspension in the cooled state, and stirring and aging, wherein A is selected from at least one of an alkali metal element and an alkaline earth metal element, and the ionic radius of A is greater than the ionic radius of sodium; and 3) filtering the suspension obtained in step 2), washing and drying the filtered precipitate to obtain a positive electrode active material;

The positive electrode active material is in particulate form, and comprises a compound represented by Formula 1:

$$Na_xA_yM1[M2(CN)_6]_\delta \cdot zH_2O \qquad \text{Formula 1}$$

wherein, A, M1, M2 and δ are each as defined above, $0<y\leq0.2$, $0<x+y\leq2$, and $0\leq z\leq10$; The particles of the positive electrode active material have a gradient layer in which the content of the A element decreases from the particle surface to the particle interior.

Thus, the positive electrode active material of the present application can be prepared.

In any of embodiments, the solvent in step 1) is a polar solvent, the solubility of the positive electrode active material precursor in the solvent is not higher than 0.02 mon, and the solubility of the salt of A in the solvent is not lower than 0.05 mol/L. By selecting the solvent, it is possible to better control the decreasing distribution trend of the element A from the particle surface to the particle interior of the positive electrode active material.

In any of embodiments, the solvent is selected from one or more of acetonitrile, adiponitrile, methanol, ethanol, water, formamide and dimethyl sulfoxide, and optionally, the solvent is acetonitrile. By selecting the solvent, it is possible to better control the decreasing distribution trend of the element A from the particle surface to the particle interior of the positive electrode active material.

In any of embodiments, in the step 2), the suspension obtained in step 1) is cooled to below 10° C., and optionally to a temperature in a range of −20 to 10° C. By controlling the reaction temperature, it is possible to better control the decreasing distribution trend of the element A from the particle surface to the particle interior of the positive electrode active material.

In any of embodiments, the molar ratio of A in the salt of A to sodium in the positive electrode active material precursor is 1:5 or less; and optionally is 1:20-1:5. By controlling the added amount of the salt of A, it is possible to avoid an excessive decrease in the specific capacity of the material while achieving an improvement in the storage performance and cycle performance of the positive electrode active material.

In any of embodiments, the positive electrode active material precursor in the step 1) is prepared by a method comprising the steps of:

i) dissolving a soluble salt of the transition metal element M1 and optionally a Na-containing slow-releasing agent in water to make a solution a;

ii) dissolving a soluble transition metal cyano complex of the transition metal element M2 in water to make a solution b;

iii) adding the solution a dropwise to the solution b under stirring, and then stirring and aging after the completion of the dropwise addition, iv) filtering the suspension obtained in step iii), and washing and drying the filtered precipitate.

By this method, a material with a more stable structure can be obtained.

In any of embodiments, the molar ratio of M1 in the soluble salt of the transition metal element M1 to M2 in the soluble transition metal cyano complex of the transition metal element M2 is in a range of 1:0.8 to 0.8:1, optionally in a range of 1:0.9 to 0.9:1. Controlling the molar ratio of M1 to M2 is conducive to the reduction of lattice defects in the material and a higher specific capacity.

In any of embodiments, in the step iii), the solution is maintained in a temperature range of 20° C.-120° C., and optionally in a temperature range of 60° C.-95° C. Thus, it is possible to ensure that the particles grow into a complete shape, reduce the tortuosity, and the particle diameter tends to be appropriate, while the element ratio is more in line with the design requirements.

In any of embodiments, the stirring and aging in step 2) is performed at a stirring rate of 50 to 1800 rpm for 1 to 30 minutes. Controlling the conditions of stirring and aging is conducive to achieving uniform doping effect quickly.

A third aspect of the present application provides a secondary battery comprising the positive electrode active material of the first aspect of the present application or the positive electrode active material prepared according to the method of the second aspect of the present application.

A fourth aspect of the present application provides an electrical apparatus comprising the secondary battery of the third aspect of the present application.

DESCRIPTION OF REFERENCE NUMERALS

1 Battery pack; 2 Upper box body; 3 Lower box body; 4 Battery module; 5 Secondary battery; 51 Case; 52 Electrode assembly; 53 Top cover assembly

DETAILED DESCRIPTION

Hereinafter, embodiments that specifically disclose a positive electrode active material and a preparation method thereof, as well as a positive electrode sheet, a secondary battery, a battery module, a battery pack, and an electrical apparatus of the present application will be described in detail with reference to the drawings as appropriate. However, there may be cases where unnecessary detailed description is omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in teens of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if a range of 60-120 and 80-110 is listed for a particular parameter, it is understood that a range of 60-110 and 80-120 is also expected. Additionally, if the minimum range values 1 and 2 are listed, and if the maximum range values 3, 4, and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), meaning that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "include/including" and "comprise/comprising" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

The existing prussian blue materials are unsatisfactory in terms of storage performance, and are prone to deterioration in electrochemical performance during long-term storage. For example, long-term storage may lead to the deterioration of cycle performance of the material.

The performance deterioration of prussian blue materials after long-term storage is strongly correlated with the water absorption of the prussian blue materials during this period. The inventors found that the storage performance of prussian blue materials can be improved by modifying the prussian blue materials with alkali metal or alkaline earth metal ions having a large ionic radius, such that the large-radius ions occupy the positions where water of crystallization might otherwise exist and reduce the water of crystallization in the lattice structure; the inventors further studied and found that by distributing the alkali metal or alkaline earth metal ions having a large ionic radius in a specific way in the particles of the prussian blue materials, it is possible to further improve the storage performance of the prussian blue materials, and also bring about an improvement in the cycle performance while mitigating the decrease in the specific capacity of the materials caused by doping the alkali metal or alkaline earth metal ions having a large ionic radius.

The modified prussian blue material of the present application is suitable for use as a positive electrode active material in sodium-ion battery.

Therefore, a first aspect of the present application provides a positive electrode active material which is in a particulate form and comprises a compound represented by Formula 1:

$$Na_xA_yM1[M2(CN)_6]_\delta \cdot zH_2O \qquad \text{Formula 1}$$

wherein, A is selected from at least one of an alkali metal element and an alkaline earth metal element, and the ionic radius of A is greater than the ionic radius of sodium; M1 and M2 are each independently selected from at least one of a transition metal element, 0<y≤0.2, 0<x+y≤2, 0<δ≤1, and 0≤z≤10; and the particles of the positive electrode active material have a gradient layer in which the content of the A element decreases from the particle surface to the particle interior.

When A is two or more elements, the above limitation on the numerical range of v is a limitation on the sum of the stoichiometric numbers of each element as A.

The chemical composition of the positive electrode active material can be measured by inductively coupled plasma emission spectroscopy (ICP), and the value of z can be determined further based on the water content of the material after the determination of x, y and δ.

Although the mechanism is still unclear, the applicant surprisingly found that: both the storage performance and the cycle performance of the positive electrode active material are improved by the specific composition of the positive electrode active material and the specific distribution of the A element, and the specific capacity of the material is not significantly decreased as compared with the prussian blue material undoped with the A element.

In some embodiments, 0.04≤y≤0.2. By controlling the content of the A element, it is possible to further reduce the water absorption of the positive electrode active material.

In some embodiments, in the particles of the positive electrode active material, the thickness of the gradient layer with respect to the A element content is in a range of 10-100 mu, and may be, for example, 10-90 nm, 10-80 nm, 10-75 nm, 10-60 nm, 10-60 nm, 10-30 nm, 10-25 nm, 20-100 nm, 20-90 nm, 20-80 nm, 20-50 nm, 20-40 nm, 30-100 nm, 30-90 nm, 30-80 nm, 30-75 nm and 30-60 nm. The thickness of the gradient layer with respect to the A element content refers to the distance from the layer with the content ratio of Na to A element reaching Na:A=50 At %:50 At % as measured when the element contents of the particles of the positive electrode active material is quantitatively measured by transmission electron microscopy-energy spectrum line scanning characterization method to the particle surface.

In the present application, a layer satisfying a specific element content as measured by transmission electron microscopy-energy spectrum line scanning characterization method means an abstract layer consisting of all points satisfying the specific element content Inside the particle, that is, it does not refer to a layer having an actual thickness. The meaning of At % is the percentage of the number of atoms of Na or A element in the sum of the number of atoms of Na and A elements as measured by transmission electron microscopy-energy spectrum line scanning characterization method. The transmission electron microscopy-energy spectrum line scanning characterization method can be carried out by using a transmission electron microscope (STEM, ThermoFisher, Talos F200i) combined with a side-insert stretchable energy dispersive X-ray spectroscopy (EDS, ThermoFisher) to perform line scan analysis on the material in the displayed picture.

By controlling the thickness of the gradient layer with respect to the A element content, it is possible to further improve the storage performance, cycle performance and specific capacity of the material.

In some embodiments, the Na content in the outermost layer of the positive electrode active material is in a range of 0.1 At % to 15 At %, relative to the total number of atoms of Na and A in the outermost layer. The outermost layer refers to the region between the layer with the content ratio of Na to A reaching Na:A=10 At %:90 At % as measured when the element contents of the particles of the positive electrode active material is quantitatively measured by transmission electron microscopy-energy spectrum line scanning characterization method and the particle surface.

In some embodiments, the A is selected from at least one of Li, K, Rb, Cs, Be, Mg, Ca, Sr and Ba, optionally at least one of K, Rb, Cs, Mg and Ca, and further optionally at least one of K and Cs. By selecting the A element, it is possible to further improve the storage performance, cycle performance and specific capacity of the material.

In some embodiments, the M1 and M2 are each independently selected from at least one of Fe, Mn, Ni, Co Cu and Zn. By selecting the species of M1 and M2, it is possible for the material to have the desired electrochemical performance and electrochemical capacity while ensuring structural integrity.

In some embodiments, the volume median particle diameter Dv50 of the positive electrode active material is in a range of 1-5 μm, and optionally in a range of 2-3.5 μm. By controlling the volume median particle diameter Dv50 of the material, it is possible to further improve the specific capacity of the material. The volume median particle diameter Dv50 can be measured by conventional methods known to those skilled in the art, for example, reference can be made to standard GB/T 19077.1-2016, using a laser particle size analyzer (such as Malvern Master Size 3000) for determination. The physical definition of Dv50 is as follows: the corresponding particle diameter when the cumulative volume distribution percentage of the material particles reaches 50%.

In some embodiments, the specific surface area of the positive electrode active material is in a range of 1-10 m²/g, and optionally in a range of 2-6 m²/g. By controlling the specific surface area of the material, it is possible to achieve the desired doping effect with a smaller amount of element A, and the doping is uniform, so that the doping effect is achieved as widely as possible with as few element A as possible. Also, uniform doping is conducive to achieving a good balance between suppressing water absorption and avoiding decrease in the specific capacity of the material. The specific surface area can be measured by conventional methods known to those skilled in the art, for example, according to the national standard GB/T 19587-2004, after determining the adsorption amount of a gas on the surface of a solid under different relative pressures at a constant low temperature, the monolayer adsorption amount of the sample is calculated based on the multilayer adsorption theory of Brunauer-Emmett-Teller (BET) and the equation thereof, and thus the specific surface area of the solid is calculated.

In some embodiments, the water content of the positive electrode active material is ≤2 wt %, and optionally, the water content of the positive electrode active material is ≤0.5 wt %. The water content refers to the saturated water absorption after the material is completely dehydrated and placed in a drying room with a dew point of −30° C. for more than one day. During battery operation, the water in the positive electrode active material migrates synchronously with the intercalation and deintercalation of Na ions, dissolves into the electrolyte solution and is decomposed to produce irreversible reaction, which affects the cycle performance. Thus the lower the water content, the better the cycle performance. The water content can be determined by heating the above-mentioned positive electrode active material which has been left for more than one day to lose water, and measuring the amount of mass reduction caused thereby.

A second aspect of the present application provides a method for preparing a positive electrode active material, the method comprising the steps of:
1) adding a positive electrode active material precursor into a solvent and dispersing to obtain a suspension, wherein the positive electrode active material precursor is a compound represented by Formula 2:

$$Na_nM1[M2(CN)_6]_\delta \qquad \text{Formula 2}$$

wherein the M1 and M2 are each independently selected from at least one of transition metal elements, 0<n≤2, and 0<δ≤1;
2) cooling the suspension obtained in step 1), then adding a salt of A into the suspension in the cooled state, and stirring and aging, wherein A is selected from at least one of an alkali metal element and an alkaline earth metal element, and the ionic radius of A is greater than the ionic radius of sodium; and
3) filtering the suspension obtained in step 2), washing and drying the filtered precipitate to obtain a positive electrode active material;

The positive electrode active material is in particulate form, and comprises a compound represented by Formula 1:

$$Na_xA_yM1[M2(CN)_6]_\delta \cdot zH_2O \qquad \text{Formula 1}$$

wherein, A, M1, M2 and δ are each as defined above, 0<y≤0.2, 0<x+y≤2, and 0≤z≤10; The particles of the positive electrode active material have a gradient layer in which the content of the A element decreases from the particle surface to the particle interior.

The explanations and definitions of M1, M2, A, x, y, δ, and z in the description section for the positive electrode active material likewise apply to the preparation method of the positive electrode active material.

By controlling the reaction temperature, the above method can achieve a specific distribution of the element A in the positive electrode active material particles.

In some embodiments, the solvent in step 1) is a polar solvent, the solubility of the positive electrode active material precursor in the solvent is not higher than 0.02 mol/L, and the solubility of the salt of A in the solvent is not lower than 0.05 mol/L. By selecting the solvent, it is possible to better control the decreasing distribution trend of the element A from the particle surface to the particle interior of the positive electrode active material.

In some embodiments, the solvent is selected from one or more of acetonitrile, adiponitrile, methanol, ethanol, water, formamide and dimethyl sulfoxide, and optionally, the solvent is acetonitrile. By selecting the solvent, it is possible to better control the decreasing distribution trend of the element A from the particle surface to the particle interior of the positive electrode active material.

In some embodiments, in the step 2), the suspension obtained in step 1) is cooled to below 10° C., and optionally to a temperature in a range of −20 to 10° C. By controlling the reaction temperature, it is possible to better control the decreasing distribution trend of the element A from the particle surface to the particle interior of the positive electrode active material.

In some embodiments, the molar ratio of A in the salt of A to sodium in the positive electrode active material precursor is 1:5 or less; and optionally is 1:20-1:5. By controlling the added amount of A, it is possible to obtain a positive electrode active material with the desired composition, and avoid an excessive decrease in the specific capacity of the material while achieving an improvement in the storage performance and cycle performance of the positive electrode active material.

In some embodiments, the positive electrode active material precursor in the step 1) is prepared by a method comprising the steps of:
i) dissolving a soluble salt of the transition metal element M1 and optionally a Na-containing slow-releasing agent in water to make a solution a;
ii) dissolving a soluble transition metal cyano complex of the transition metal element M2 in water to make a solution b;
iii) adding the solution a dropwise to the solution b under stirring, and then stirring and aging after the completion of the dropwise addition,
iv) filtering the suspension obtained in step iii), and washing and drying the filtered precipitate.

The positive electrode active material precursor prepared by this method has less defects and high sodium content, which helps to obtain a structurally stable material.

In some embodiments, the molar ratio of M1 in the soluble salt of the transition metal element M1 to M2 in the soluble transition metal cyano complex of the transition metal element M2 is in a range of 1:0.8 to 0.8:1, optionally in a range of 1:0.9 to 0.9:1. Controlling the molar ratio of M1 to M2 is conducive to the reduction of lattice defects in the material, the storage of more Na and a higher specific capacity.

In some embodiments, in the step iii), the solution is maintained in a temperature range of 20° C.-120° C., optionally in a temperature range of 60° C.-95° C., and optionally 70° C.-80° C. A suitable synthesis temperature can ensure that the particles grow into a complete shape, reduce the tortuosity, and the particle diameter tends to be appropriate, while the element ratio is more in line with the design requirements.

In some embodiments, the stirring and aging in step 2) is performed at a stirring rate of 50 to 1800 rpm for 1 to 30 minutes. Controlling the conditions of stirring and aging is conducive to achieving uniform doping effect quickly.

In some embodiments, the dispersion in step 1) can be carried out in an appropriate way selected by those skilled in the art. In some embodiments, in step 1), the dispersion is assisted by sonication and stirring.

In some embodiments, the Na-containing slow-releasing agent in step i) is at least one selected from sodium citrate, sodium ascorbate, disodium ethylenediamine tetraacetate, tetrasodium ethylenediamine tetraacetate, sodium chloride, sodium sulfate and sodium acetate.

In some embodiments, in step the molar ratio of the transition metal element M1 to the slow-releasing agent is 1:0.1-10. Optionally, the molar ratio of the transition metal element M1 to the slow-releasing agent is 1:1-5.

The anion of the soluble salt of the transition metal element M1 in step i) is not particularly limited as long as the salt is a soluble salt. In some embodiments, the soluble salt of the transition metal element M1 is a divalent sulfate, a nitrate, a chloride, or a salt of weak acid, e. g. an oxalate. Its concentration in the solution is, for example, in a range of 0.01 mol/L-1 mol/L.

In some embodiments, the Na-containing slow-releasing agent in step i) is at least one selected from sodium citrate, sodium ascorbate, disodium ethylenediamine tetraacetate, tetrasodium ethylenediamine tetraacetate, sodium chloride, sodium sulfate and sodium acetate.

In some embodiments, the soluble transition metal cyano complex in step ii) is a divalent transition metal sodium cyanide. Its concentration in the solution is, for example, in a range of 0.01 mol/L-1 mol/L.

In some embodiments, in step iii), the stirring rate is in a range of 200 rpm-1200 rpm. In some embodiments, in step iii), the solution a is added dropwise at a rate of 0.1 ml/min-10 ml/min, for example at a rate of 1 ml/min-5 ml/min.

In some embodiments, in step iii), the aging is performed for 0.01 h-48 h, for example 12 h-24 h, and the aging can be performed, for example, under stirring.

The washing in step iv) can be carried out with an appropriate solvent selected by those skilled in the art. In some embodiments, in step iv), the washing can be carried out by using a mixture of deionized water and ethanol, ethanol or acetone, etc., and can be carried out for one or more times.

The drying in step iv) can be carried out in an appropriate drying method selected by those skilled in the art. In some embodiments, in step iv), the drying is carried out by vacuum drying, for example at a temperature in a range of 0-300° C., for example 120° C.-150° C.; and the vacuum is for example 10-15 moor.

In the step 2), the anion of the salt of A is not particularly limited. In some embodiments, the anion of the salt of A is selected from one of $Cl^-$, $SO_4^{3-}$, $NO_3^-$, $C_2O_4^{2-}$ and $PO_4^{3-}$, and optionally one of $SO_4^{2-}$, $NO_3^-$ and $C_2O_4^{2-}$.

The drying in step 3) can be carried out in an appropriate drying method selected by those skilled in the art. In some embodiments, in step 3), the drying is carried out by vacuum drying, for example at a temperature in a range of 0-300° C., for example 120° C.-150° C.; and the vacuum is for example 100-150 mTorr.

Additionally, the secondary battery, the battery module, the battery pack and the electrical apparatus of the present application will be described below with appropriate reference to the accompanying drawings.

In an embodiment of the present application, a sodium-ion secondary battery is provided.

Generally, a secondary battery comprises a positive electrode sheet, a negative electrode sheet, an electrolyte, and a separator. During charging and discharging of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Positive Electrode Sheet]

The positive electrode sheet comprises a positive electrode current collector and a positive electrode film layer provided on at least one surface of the positive electrode current collector, and the positive electrode film layer comprises the positive electrode active material of the first aspect of the present application or the positive electrode active material prepared by the method of the second aspect of the present application.

As an example, the positive electrode current collector has two opposite surfaces in its own thickness direction, and the positive electrode film layer is provided on either or both of the two opposite surfaces of the positive electrode current collector.

In some embodiments, the positive electrode current collector can be a metal foil or a composite current collector. For example, an aluminum foil can be used as the metal foil. The composite current collector may comprise a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on the high molecular material substrate (such as polypropylene (PP), polyethylene terephthalate (PET), polybutylene terephthalate (PBT), polystyrene (PS), and polyethylene (PE), etc.).

In some embodiments, the positive electrode film layer further optionally comprises a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode film layer further optionally comprises a conductive agent. As an example, the conductive agent may include at least one of superconducting carbon, acetylene black, carbon black, Ketjen black, carbon dot, carbon nanotube, graphene, and carbon nanofiber.

In some embodiments, the positive electrode sheet can be prepared by: dispersing the above-mentioned components for preparing the positive electrode sheet, for example, the positive electrode active material, the conductive agent, the binder and any other components, in a solvent (for example N-methyl pyrrolidone) to form a positive electrode slurry; and coating the positive electrode slurry on a positive electrode current collector, followed by oven drying, cold pressing and other procedures, to obtain the positive electrode sheet.

[Negative Electrode Sheet]

The negative electrode sheet comprises a negative electrode current collector and a negative electrode film layer provided on at least one surface of the negative electrode current collector, wherein the negative electrode film layer comprises a negative electrode active material.

As an example, the negative electrode current collector has two opposite surfaces in its own thickness direction, and the negative electrode film layer is provided on either or both of the two opposite surfaces of the negative electrode current collector.

In some embodiments, the negative electrode current collector can be a metal foil or a composite current collector. For example, a copper foil can be used as the metal foil. The composite current collector may comprise a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE), etc.).

In some embodiments, the negative electrode active material may be a negative electrode active material for secondary batteries well known in the art. As an example, the negative electrode active material may include at least one of the following materials: artificial graphite, natural graphite, soft carbon, hard carbon, silicon-based material, tin-based material, and lithium titanate, etc. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. The conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other auxiliaries, for example, a thickener (such as sodium carboxymethyl cellulose (CMC-Na)) and the like.

In some embodiments, the negative electrode sheet can be prepared by: dispersing the above-mentioned components for preparing the negative electrode sheet, for example, the negative electrode active material, the conductive agent, the binder and any other components, in a solvent (for example, deionized water) to form a negative electrode slurry; and coating the negative electrode slurry on a negative electrode current collector, followed by oven drying, cold pressing and other procedures, to obtain the negative electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, the electrolyte is in a liquid state, that is, it is an electrolyte solution. The electrolyte solution comprises an electrolyte salt and a solvent.

In some embodiments, the electrolyte salt may be selected from $NaClO_4$, $NaPF_6$, $NaBF_4$, NaTFSI (sodium bis-trifluoroinethanesulfonyl imide), NaFSI (sodium bis-fluorosulfonyl imide), NaDFOB (sodium difluoro(oxalato)borate) and the like.

In some embodiments, the solvent may be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution further optionally comprises an additive. For example, the additive may include a negative electrode film-forming additive, a positive electrode film-forming additive, and may further include an additive capable of improving certain performances of the battery, such as an additive for improving the overcharge performance of the battery, and an additive for improving the high-temperature or low-temperature performance of the battery, etc.

[Separator]

In some embodiments, the secondary battery further comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, and there is no particular limitation.

In some embodiments, the positive electrode sheet, the negative electrode sheet, and the separator can be made into an electrode assembly by a winding process or a lamination process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a pouch type soft pack. The material of the soft pack may be a plastic, and examples of the plastic include polypropylene, polybutylene terephthalate and polybutylene succinate, etc.

Figure 1:
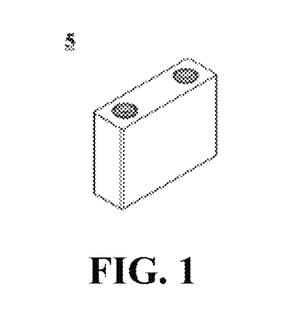
FIG. 1 is a schematic view of a secondary battery according to an embodiment of the present application.

The shape of the secondary battery is not particularly limited in the present application, and may be cylindrical, square, or any other shapes. For example, FIG. 1 shows a secondary battery 5 with a square structure as an example.

Figure 2:
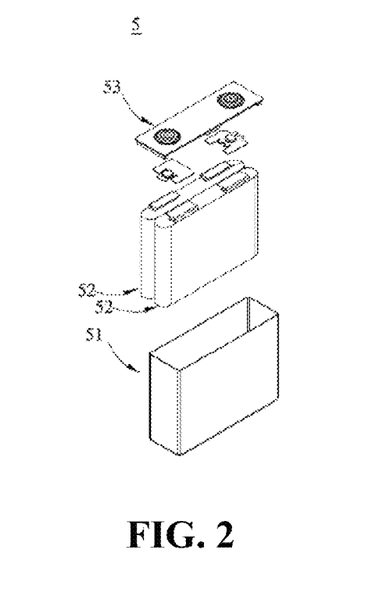
FIG. 2 is an exploded view of the secondary battery according to an embodiment of the present application shown in FIG. 1.

In some embodiments, referring to FIG. 2, the outer package may comprise a case 51 and a cover plate 53. Here, the case 51 may comprise a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the separator can be formed into an electrode assembly 52 by a winding process or a lamination process. The electrode assembly 52 is encapsulated within the accommodating cavity. The electrolyte solution impregnates the electrode assembly 52. The number of electrode assemblies 52 contained in the secondary battery 5 may be one or more, which can be selected by those skilled in the art according to specific actual requirements.

In some embodiments, secondary batteries can be assembled into a battery module, and the number of secondary batteries contained in the battery module can be one or more, and the specific number can be selected by those skilled in the art according to the application and capacity of the battery module.

Figure 3:
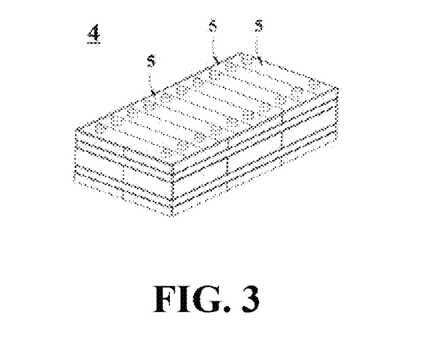
FIG. 3 is a schematic view of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, the battery module 4 may further comprise a case having an accommodating space, in which the plurality of secondary batteries 5 are accommodated.

In some embodiments, the above-mentioned battery modules may further be assembled into a battery pack, and the number of battery modules contained in the battery pack may be one or more, and the specific number can be selected by those skilled in the art according to the application and capacity of the battery pack.

Figure 4:
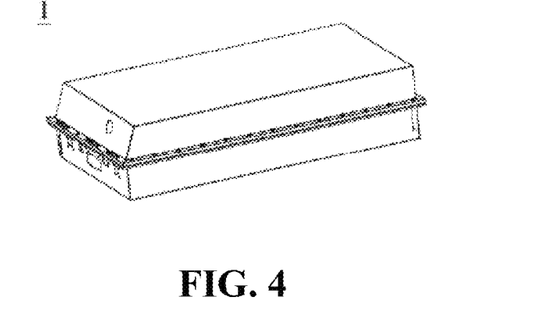
FIG. 4 is a schematic view of a battery pack according to an embodiment of the present application.
Figure 5:
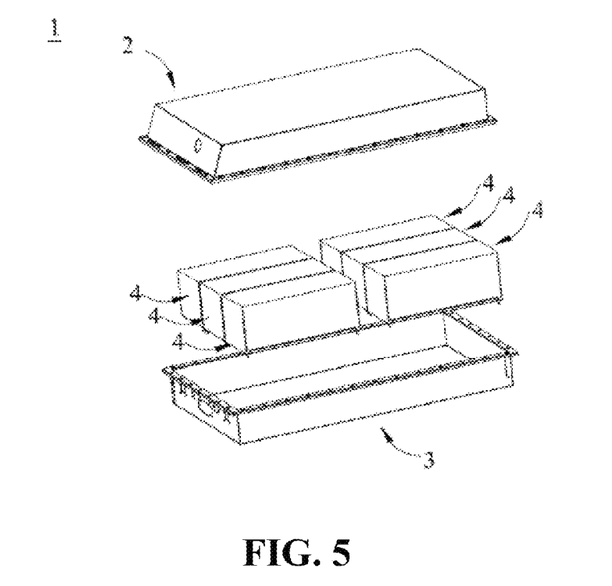
FIG. 5 is an exploded view of the battery pack according to an embodiment of the present application shown in FIG. 4.

FIG. 4 and FIG. 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 and forms an enclosed space for accommodating the battery modules 4. The plurality of battery modules 4 may be arranged in the battery box in any manner.

Additionally, the present application further provides an electrical apparatus comprising at least one of the secondary battery, battery module or battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack may be selected according to its use requirements.

Figure 6:
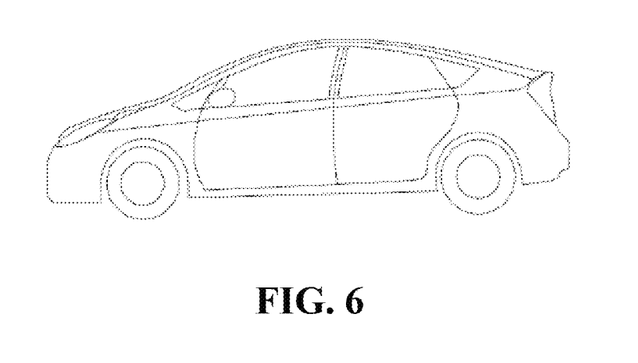
FIG. 6 is a schematic view of an electrical apparatus in which a secondary battery is used as a power source according to an embodiment of the present application.

FIG. 6 shows an electrical apparatus as an example. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described hereinafter. The examples described below are exemplary, and are used only to explain the present application and are not to be construed as limiting the present application.

Where specific techniques or conditions are not specified in the examples, the techniques or conditions described in the literatures of the art or the product specifications are followed. Where manufacturers are not specified, the reagents or instruments used are conventional products and are commercially available.

Example 1

1. Preparation of Positive Electrode Active Material (1) 19.3624 g of sodium ferrocyanide decahydrate, 35.292 g of sodium citrate monohydrate and 7.9164 g of manganese chloride tetrahydrate were weighed. The above-mentioned sodium ferrocyanide decahydrate was added to 100 ml of deionized water, and stirred for 30 min to form a solution b. Manganese chloride tetrahydrate and sodium citrate monohydrate were added to 100 ml of deionized water, stirred for 30 min to form a solution a, and added dropwise to the above-mentioned solution b after uniform stirring. The rate of dropwise addition was 1 ml/min, and after the completion of the dropwise addition, the mixture was stirred for 24 h at a stirring rate of 400 rpm and a temperature of 80° C. to form a suspension. The solid material in the above-mentioned suspension was filtered with a Buchner funnel, and washed 3 times with deionized water until no sodium salt and transition metal ions remained in the product. The obtained material was vacuum-dried at 120° C. for 24 h with a relative vacuum degree <−0.1 Mpa to obtain 10 g of prussian blue $Na_2MnFe(CN)_6$ precursor.

(2) 10 g of the above-mentioned prussian blue precursor was added to 100 ml of acetonitrile, sonicated and dispersed for 10 min to form a suspension, and the solution was cooled to −20° C. 0.745 g of potassium chloride was weighed into the above-mentioned suspension, and continually stirred and aged for 30 min. The stirring rate was 400 rpm, and the temperature was −20° C.

(3) The solid material in the suspension was filtered with a Buchner funnel, and washed 3 times with diethyl ether at −20°, until no sodium and potassium salts and transition metal ions remained in the product. The obtained material was vacuum-dried at 120° C. for 24 h with a relative vacuum degree of −0.085 MPa to obtain a positive electrode active material. Its chemical formula was determined to be $Na_{1.9}K_{0.1}MnFe(CN)_6$ by ICP test, and it is determined by EDS line scanning detection that: the obtained positive electrode active material particles had a gradient layer in which the content of K element decreased from the particle surface of the positive electrode active material to the particle interior thereof.

Example 2

A positive electrode active material was prepared by steps similar to those of Example 1, except that in (2), the temperature of the suspension was controlled at −5° C., and the diethyl ether used in the washing of (3) was also at −5° C.

Example 3

A positive electrode active material was prepared by steps similar to those of Example 1, except that in (2), the temperature of the suspension was controlled at 5° C., and the diethyl ether used in the washing of (3) was also at 5° C.

Example 4

A positive electrode active material was prepared by steps similar to those of Example 1, except that in (2), the temperature of the suspension was controlled at 10° C., and the diethyl ether used in the washing of (3) was also at 10° C.

Example 5

A positive electrode active material was prepared by steps similar to those of Example 4, except that the solvent used in (2) was water.

Example 6

A positive electrode active material was prepared by steps similar to those of Example 3, except that the solvent used in (2) was methanol.

Example 7

A positive electrode active material was prepared by steps similar to those of Example 3, except that the solvent used in (2) was formamide.

Example 8

A positive electrode active material was prepared by steps similar to those of Example 3, except that the solvent used in (2) was dimethyl sulfoxide.

Example 9

A positive electrode active material was prepared by steps similar to those of Example 1, except that in (2), potassium chloride was added in a mass of 0.894 g.

Example 10

A positive electrode active material was prepared by steps similar to those of Example 1, except that in (2), potassium chloride was added in a mass of 0.298 g.

Example 11

A positive electrode active material was prepared by steps similar to those of Example 1, except that in (2), 1.065 g of potassium chloride was added to the suspension.

Example 12

A positive electrode active material was prepared by steps similar to those of Example 3, except that in (1), the reaction temperature of the solution a and the solution b was 60° C.

Example 13

A positive electrode active material was prepared by steps similar to those of Example 3, except that in (1), the reaction temperature of the solution a and the solution b was 95° C.

Example 14

A positive electrode active material was prepared by steps similar to those of Example 3, except that in (1), the reaction temperature of the solution a and the solution b was 50° C.

Example 15

A positive electrode active material was prepared by steps similar to those of Example 3, except that in (1), the reaction temperature of the solution a and the solution b was 106° C.

Comparative Example 1

10 g of prussian blue $Na_2MnFe(CN)_6$ was prepared according to the step (1) of Example 1.

Comparative Example 2

A positive electrode active material was prepared by steps similar to those of Example 1, except that in (2), the temperature of the suspension was controlled at 20° C., and the diethyl ether used in the washing of (3) was also at 20° C.

Preparation of Battery (1) Preparation of positive electrode sheet: positive electrode active material prepared in each of the above Examples and Comparative Examples, conductive agent carbon black (Super-P), and binder polyvinylidene fluoride (PVDF) were added to N-methyl pyrrolidone (NMP) in a mass ratio of 7:2:1, and stirred by a rotor for 1-3 h to make a slurry. The slurry was coated on a current collector aluminum foil with a coating thickness of 150 μm. It was dried in a vacuum drying oven at 90-110° C. for 10-15 h, and then naturally cooled down to room temperature to obtain the positive electrode sheet. The prepared positive electrode sheet was cut into a small disc with a diameter of 14 mm by a cutting machine.

(2) Preparation of negative electrode sheet: Type II commercial hard carbon negative electrode active material purchased from KURARAY of Japan, conductive agent carbon black (Super-P), binder styrene butadiene rubber (SBR) and dispersing agent sodium carboxymethyl cellulose (CMC-Na) were added to deionized water in a mass ratio of 90:2:4:4, and stirred by a rotor for 1-3 h to make a slurry. The sluity was coated on a current collector copper foil, the coating amount is determined according to the absolute capacity of the positive electrode, and the absolute capacity of the negative electrode: the absolute capacity of the positive electrode=1.16, wherein the absolute capacity (mAh)=reversible specific capacity of the first discharge (mAhig)*the total weight of the active material (g), and the reversible specific capacity was measured by a method as described below. It was dried in a vacuum drying oven at 90-110° C. for 10-15 h, and then naturally cooled down to room temperature to obtain the negative electrode sheet. The prepared negative electrode sheet was cut into a small disc with a diameter of 16 mm by a cutting machine.

(3) Preparation of Electrolyte Solution

In an argon atmosphere glove box with a water content of <10 ppm, equal volumes of ethylene carbonate (EC) and diethyl carbonate (DEC) were mixed uniformly to obtain an organic solvent, an additive fluoroethylene carbonate (FEC) was added into the organic solvent, and then a sodium salt $NaPF_6$ was uniformly dissolved in the above-mentioned organic solvent to obtain an electrolyte solution, wherein the mass percentage of FEC in the electrolyte solution was 2%, and the concentration of the sodium salt was 1 mol/L.

(4) Separator

A PE separator was used as the separator.

(5) Preparation of Button-Type Full Battery

In a glove box filled with argon atmosphere, the above components were assembled into a CR 2032 button-type full battery as the secondary battery described below.

Method for Performance Test

1. Positive Electrode Active Material Test (1) ICP Test

The material to be tested was heated to 500° C. and calcined for 2 h, and then lowered to room temperature. The calcined product was dissolved by adding aqua regia, and then elemental analysis was performed by inductively coupled plasma emission spectroscopy (ICP Ametek, model: SPECTRO ARCOS ICP-OES). This test could obtain the ratio of each element, through which x, y and δ in the chemical formula $Na_xA_yM1[M2(CN)_6]_δ$ were determined.

(2) Transmission Electron Microscopy-Energy Spectrum Line Scanning (EDS Line Scanning) Detection A transmission electron microscope (STEM, ThermoFisher, Talos F200i) combined with a side-insert stretchable energy dispersive X-ray spectroscopy (EDS, ThermoFisher) was used to perform line scan analysis on the material in the displayed picture. Here, the accelerating voltage was 50 kV, the amplification factor was 100 kx, and the beam current was between 500~1000 pA. The line scanning patterns of Na and A element numbers (Counts) were obtained. The layer with Na:A=50 At %:50 At % and the surface of the positive electrode active material were determined according to the element number ratios of Na and A to obtain the thickness of the gradient layer. The thickness of the gradient layer was measured at 5 randomly selected positions on the positive electrode active material particles, respectively, and the arithmetic mean value of the measured results was taken and recorded as the thickness of the gradient layer in Table 1.

Likewise, the layer with Na:A=10 At %:90 At % was determined according to the element number ratios of Na and A, which was the inner boundary of the outermost layer, and the surface of the positive electrode active material was the outer boundary of the outermost layer; and by curve integration of the EDS line scanning curves of the two elements of Na and A over the interval between the inner boundary and the outer boundary of the outermost layer, the total content ratio of the two elements was obtained, and in turn the Na content in the outermost layer was measured out.

(3) Water Content Test

The positive electrode active materials prepared in Examples and Comparative Examples were completely dehydrated, and then placed in a drying room with a dew point of −30° C. for one day. They were then taken out and heated to 200° C. for half an hour. The mass of the tested material before and after heating was measured with an electronic balance, the difference therebetween was calculated, and was divided by the mass of the tested material before heating to obtain the water content of the tested material.

(4) Dv50 Test

According to GB/T 19077.1-2016, a laser particle size analyzer (such as Malvern Master Size 3000) was used for determination.

Here, the physical definition of Dv50 is as follows: the corresponding particle diameter when the cumulative volume distribution percentage of the material particles reaches 50%.

(5) Specific Surface Area Test

With reference to GB/T 19587-2017, the specific surface area was tested by nitrogen adsorption specific surface area analysis test method and calculated by BET (Bnmauer Emmett Teller) method, wherein the nitrogen adsorption specific surface area analysis test was performed by Tri-Star 3020 model specific surface area aperture analyzer from Micromeritics of USA.

2. Battery Performance Test

[Reversible Specific Capacity]

Preparation of button-type half battery: the positive electrode sheet, the electrolyte solution and the separator were all the same as the above-mentioned button-type full battery. A metal sodium sheet (a small disc with a diameter of 13 mm) was used as the negative electrode, and a nickel mesh was used as the negative electrode current collector. In an argon protected glove box, the above components were assembled into a CR 2032 button-type half battery.

In the interval of 2.5-4.0 V at 25° C., the above-mentioned button-type half battery was charged and discharged at a current density of 20 mA/g, the capacity of the battery during the first charge-discharge was recorded, and the reversible specific capacity was obtained by dividing the capacity by the mass of the positive electrode active material. The test results of the first discharge reversible specific capacity of the batteries prepared with the positive electrode active materials of the respective Examples and Comparative Examples were listed in Table 1 below.

[Storage Performance]

At 25° C., the secondary batteries prepared in the respective Examples and Comparative Examples were charged to a charging cut-off voltage of 4 V at a rate of 1 C, and then charged to a current of 0.05 C at a constant voltage, left standing for 5 min, and then discharged to a discharge cut-off voltage of 2 V at a constant current rate of 0.33 C, thus obtaining the initial capacities of the batteries. Then, at 25° C., the batteries were charged to a charging cut-off voltage of 4 V at a rate of 1 C, and then charged to a current of 0.05 C at a constant voltage, at which time the batteries were in a fully charged state, and the fully charged batteries were placed in a thermostatic box at 60° C. for storage. After 100 days of storage, the capacities of the batteries at this time were tested, and specifically, the batteries were charged to a charging cut-off voltage of 4 V at a rate of 1 C, and then charged to a current of 0.05 C at a constant voltage, left standing for 5 min, and then discharged to a discharging cut-off voltage of 2 V at a constant current rate of 0.33 C, thus obtaining the post-storage capacities of the batteries. The percentage of the post-storage capacity of the battery in the initial capacity of the battery was calculated and recorded in Table 1 as the 100-days storage performance

[Long-Term Cycle Performance]

At 25° C., the secondary batteries prepared in Examples and Comparative Examples were charged at a constant current rate of 1 C to a charging cut-off voltage of 4 V, and then charged at a constant voltage to a current of ≤0.05 C, left standing for 5 min, and then discharged at a constant current rate of 1 C to a discharging cut-off voltage of 2 V, thus obtaining the discharge capacities of the first-cycle of the batteries, and the batteries were left standing for 5 min, which was a charge-discharge cycle. According to this method, the batteries were subjected to cyclic charge-discharge test for a total of 200 cycles, and the discharge capacities of the last cycle were obtained. Capacity retention rate after 200 cycles (%)=discharge capacity of the last cycle/discharge capacity of the first cycle.

TABLE 1

| | Cooling temperature (° C.) in step (2) | Solvent in step (2) | Molar ratio of A element to sodium in the positive electrode active material precursor | Reaction temperature (° C.) of solution a and solution b in step (1) |
|---|---|---|---|---|
| Example 1 | −20 | Acetonitrile | 1:6.39 | 80 |
| Example 2 | −5 | Acetonitrile | 1:6.39 | 80 |
| Example 3 | 5 | Acetonitrile | 1:6.39 | 80 |
| Example 4 | 10 | Acetonitrile | 1:6.39 | 80 |
| Example 5 | 10 | Water | 1:6.39 | 80 |
| Example 6 | 5 | Methanol | 1:6.39 | 80 |
| Example 7 | −20 | Formamide | 1:6.39 | 80 |
| Example 8 | −20 | Dimethyl sulfoxide | 1:6.39 | 80 |
| Example 9 | −20 | Acetonitrile | 1:5.33 | 80 |
| Example 10 | −20 | Acetonitrile | 1:15.98 | 80 |
| Example 11 | −20 | Acetonitrile | 1:4.47 | 80 |
| Example 12 | −20 | Acetonitrile | 1:6.39 | 60 |
| Example 13 | −20 | Acetonitrile | 1:6.39 | 95 |
| Example 14 | −20 | Acetonitrile | 1:6.39 | 50 |
| Example 15 | −20 | Acetonitrile | 1:6.39 | 106 |
| Comparative Example 1 | — | — | — | — |
| Comparative Example 2 | 20 | Acetonitrile | 1:6.39 | 80 |

TABLE 2

| | Chemical formula | Gradient layer thickness (nm) | Na content in the outermost layer (%) | Dv50 (μm) | Specific surface area (m$^2$/g) | Water content (ppm by weight) | Specific capacity (mAh/g) | 100-days storage performance (%) | Capacity retention rate after 200 cycles (%) |
|---|---|---|---|---|---|---|---|---|---|
| Example 1 | Na$_{1.9}$K$_{0.1}$Mn[Fe(CN)$_6$] | 10 | 0.8 | 2 | 4.2 | 1547 | 154.9 | 98.2 | 95.6 |
| Example 2 | Na$_{1.9}$K$_{0.1}$Mn[Fe(CN)$_6$] | 21 | 1.3 | 2 | 4.2 | 2323 | 154.8 | 97.6 | 94.5 |
| Example 3 | Na$_{1.9}$K$_{0.1}$Mn[Fe(CN)$_6$] | 56 | 4.4 | 2 | 4.2 | 5610 | 154.5 | 95.5 | 90.9 |
| Example 4 | Na$_{1.9}$K$_{0.1}$Mn[Fe(CN)$_6$] | 84 | 9.0 | 2 | 4.2 | 8329 | 154.6 | 93.4 | 88.0 |
| Example 5 | Na$_{1.9}$K$_{0.1}$Mn[Fe(CN)$_6$] | 100 | 10 | 2 | 4.2 | 9288 | 154.1 | 93.9 | 87.7 |
| Example 6 | Na$_{1.9}$K$_{0.1}$Mn[Fe(CN)$_6$] | 71 | 5.3 | 2 | 4.2 | 5814 | 154.3 | 95.0 | 89.0 |
| Example 7 | Na$_{1.9}$K$_{0.1}$Mn[Fe(CN)$_6$] | 12 | 1.4 | 2 | 4.2 | 1896 | 153.8 | 97.1 | 94.9 |
| Example 8 | Na$_{1.9}$K$_{0.1}$Mn[Fe(CN)$_6$] | 15 | 1.8 | 2 | 4.2 | 2001 | 153.7 | 96.6 | 92.5 |
| Example 9 | Na$_{1.88}$K$_{0.12}$Mn[Fe(CN)$_6$] | 25 | 1.5 | 2 | 4.2 | 1270 | 153.9 | 98.7 | 93.1 |
| Example 10 | Na$_{1.96}$K$_{0.04}$Mn[Fe(CN)$_6$] | 10 | 0.8 | 2 | 4.2 | 2852 | 155.0 | 95.0 | 92.8 |
| Example 11 | Na$_{1.8}$K$_{0.2}$Mn[Fe(CN)$_6$] | 12 | 0.7 | 2 | 4.2 | 1340 | 149.8 | 98.7 | 95.6 |
| Example 12 | Na$_{1.9}$K$_{0.1}$Mn[Fe(CN)$_6$] | 14 | 0.7 | 1 | 10 | 1289 | 150.2 | 98.5 | 95.6 |

TABLE 2-continued

| | Chemical formula | Gradient layer thickness (nm) | Na content in the outermost layer (%) | Dv50 (μm) | Specific surface area (m²/g) | Water content (ppm by weight) | Specific capacity (mAh/g) | 100-days storage performance (%) | Capacity retention rate after 200 cycles (%) |
|---|---|---|---|---|---|---|---|---|---|
| Example 13 | $Na_{1.9}K_{0.1}Mn[Fe(CN)_6]$ | 9 | 1.1 | 5 | 1 | 3563 | 154.7 | 96.9 | 93.1 |
| Example 14 | $Na_{1.9}K_{0.1}Mn[Fe(CN)_6]$ | 23 | 0.2 | 0.8 | 15.6 | 969 | 150.3 | 98.8 | 95.6 |
| Example 15 | $Na_{1.9}K_{0.1}Mn[Fe(CN)_6]$ | 5 | 2.6 | 6 | 0.85 | 6894 | 154.4 | 88.8 | 81.6 |
| Comparative Example 1 | $Na_2Mn[Fe(CN)_6]$ | — | 100 | 2 | 4.2 | 120000 | 152.1 | 87.4 | 80.2 |
| Comparative Example 2 | $Na_{1.9}K_{0.1}Mn[Fe(CN)_6]$ | 196 | 13.6 | 2 | 4.2 | 85600 | 152.6 | 88.1 | 84.8 |

As confirmed by EDS line scanning detection, the distribution states of the A element in Examples 1-15 all showed a decreasing trend from the particle surface to the particle interior of the positive electrode active materials, and in contrast, the distribution state of the A element in Comparative Example 2 showed an increasing trend from the particle surface to the particle interior of the positive electrode active material.

As compared with Comparative Example 1, it can be seen that the positive electrode active material particles of Examples have a significantly reduced water content by having a layer doped with the A element on the surface, and both the cycle performance and the storage performance are significantly improved. Compared with Comparative Example 2, it can be seen that, when the particles of the positive electrode active material have a gradient layer in which the content of the A element decreases from the particle surface to the particle interior, the water content is lower, and the specific capacity, cycle performance and storage performance are better than that when the content of the A element increases from the particle surface to the particle interior.

When the gradient layer thickness is in a range of 10-100 nm, the positive electrode active material has good storage performance, cycle performance and specific capacity; and especially when the gradient layer thickness is in a range of 10-75 mu, the storage performance, cycle performance and specific capacity are further improved.

It should be noted that the present application is not limited to the above-mentioned embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A positive electrode active material which is in a particulate form and comprises a compound represented by Formula 1:

$Na_xA_yM1[M2(CN)_6]_\delta \cdot zH_2O$  Formula 1 wherein, A is selected from at least one of an alkali metal element and an alkaline earth metal element, and an ionic radius of A is greater than an ionic radius of sodium; M1 and M2 are each independently selected from at least one of a transition metal element, ($<y \leq 0.2$, $0 < x+y \leq 2$, $0 < \delta \leq 1$, and $0 \leq z \leq 10$; and particles of the positive electrode active material have a gradient layer in which a content of an A element decreases from a particle surface to a particle interior.

2. The positive electrode active material according to claim 1, wherein $0.04 \leq y \leq 0.2$.

3. The positive electrode active material according to claim 1, wherein in the particles of the positive electrode active material, a thickness of the gradient layer with respect to an A element content is in a range of 10-100 nm, wherein the thickness of the gradient layer with respect to the A element content refers to a distance from a layer with a content ratio of Na to A element reaching Na:A-50At %: 50At % as measured when element contents of the particles of the positive electrode active material is quantitatively measured by a transmission electron microscopy-energy spectrum line scanning characterization method to the particle surface.

4. The positive electrode active material according to claim 1, wherein the A is selected from at least one of Li, K, Rb, Cs, Be, Mg, Ca, Sr and Ba.

5. The positive electrode active material according to claim 1, wherein the M1 and M2 are each independently selected from at least one of Fe, Mn, Ni, Co, Cu and Zn.

6. The positive electrode active material according to claim 1, wherein a volume median particle diameter Dv50 of the positive electrode active material is in a range of 1-5 μm.

7. The positive electrode active material according to claim 1, wherein a specific surface area of the positive electrode active material is in a range of 1-10 m²/g.

8. The positive electrode active material according to claim 1, wherein a water content of the positive electrode active material is ≤2 wt %.

9. A method for preparing a positive electrode active material, the method comprising the steps of:
1) Adding a positive electrode active material precursor into a solvent and dispersing to obtain a suspension, wherein the positive electrode active material precursor is a compound represented by Formula 2:

$Na_nM1[M2(CN)_6]_\delta$  Formula 2 wherein the M1 and M2 are each independently selected from at least one of transition metal elements, $0 < n \leq 2$, and $0 < \delta \leq 1$;
2) Cooling the suspension obtained in step 1), then adding a salt of A into the suspension in the cooled state, and stirring and aging, wherein A is selected from at least one of an alkali metal element and an alkaline earth metal element, and an ionic radius of A is greater than an ionic radius of sodium; and 3) Filtering the suspension obtained in step 2), washing and drying the filtered precipitate to obtain a positive electrode active material;

the positive electrode active material is in particulate form, and comprises a compound represented by Formula 1:

$Na_xA_yM1[M2(CN)_6]\delta \cdot zH_2O$    Formula 1 wherein, A, M1, M2 and $\delta$ are each as defined above, $0<y\leq 0.2$, $0<x+y\leq 2$, and $0\leq z=10$; and a particle of the positive electrode active material has a gradient layer in which a content of A element decreases from a surface of the particle to an interior of the particle.

10. The method according to claim 9, wherein the solvent in step 1) is a polar solvent, solubility of the positive electrode active material precursor in the solvent is not higher than 0.02 mol/L, and solubility of the salt of A in the solvent is not lower than 0.05 mol/L.

11. The method according to claim 9, wherein the solvent is selected from one or more of acetonitrile, adiponitrile, methanol, ethanol, water, formamide and dimethyl sulfoxide.

12. The method according to claim 9, wherein in the step 2), the suspension obtained in step 1) is cooled to below 10° C.

13. The method according to claim 9, wherein a molar ratio of A in the salt of A to sodium in the positive electrode active material precursor is 1:5 or less.

14. The method according to claim 9, wherein,
the positive electrode active material precursor in the step 1) is prepared by a method comprising the steps of:
   i) dissolving a soluble salt of the transition metal element M1 and optionally a Na-containing slow-releasing agent in water to make a solution a;
   ii) dissolving a soluble transition metal cyano complex of the transition metal element M2 in water to make a solution b;
   iii) adding the solution a dropwise to the solution b under stirring, and then stirring and aging after completion of dropwise addition of the solution a to the solution b; and
   iv) filtering the suspension obtained in step iii), and washing and drying the filtered precipitate.

15. The method according to claim 14, wherein a molar ratio of M1 in the soluble salt of the transition metal element M1 to M2 in the soluble transition metal cyano complex of the transition metal element M2 is in a range of 1:0.8 to 0.8:1.

16. The method according to claim 14, wherein in the step iii), the solution is maintained in a temperature range of 20° C.-120° C.

17. The method according to claim 9, wherein the stirring and aging in step 2) is performed at a stirring rate of 50 to 1800 rpm for 1 to 30 minutes.

18. A secondary battery comprising the positive electrode active material according to claim 1.

19. An electrical apparatus comprising the secondary battery according to claim 18.

* * * * *